J. KENNEDY.
RAIL JOINT.
APPLICATION FILED SEPT. 22, 1913.
1,135,695.  Patented Apr. 13, 1915.
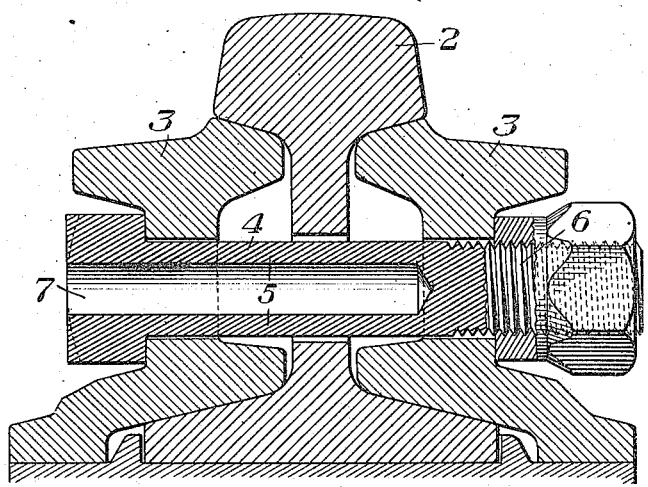
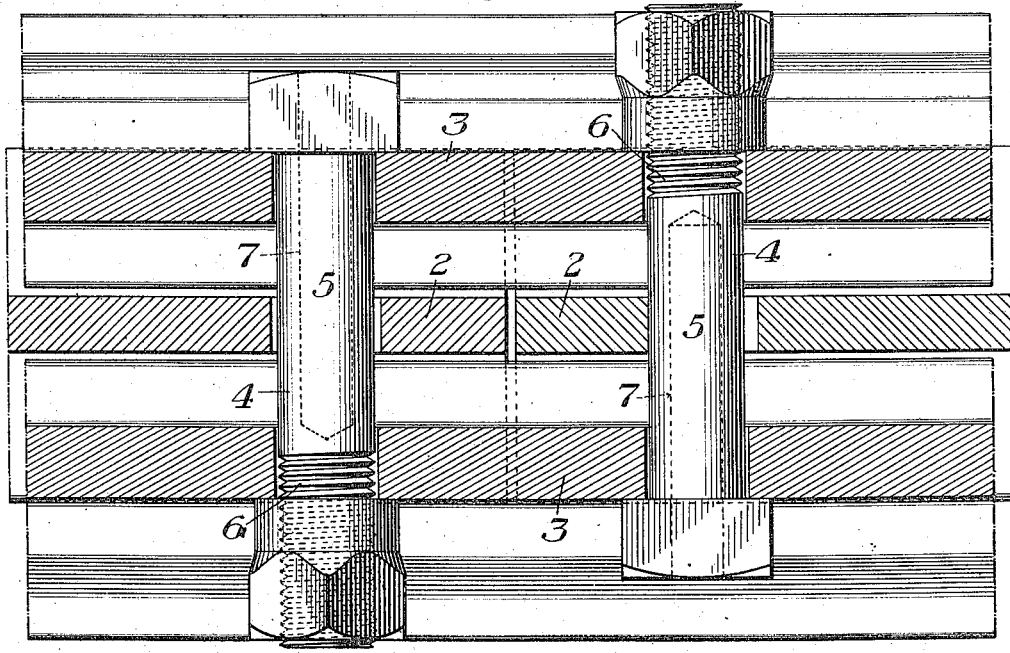
WITNESSES  
INVENTOR

UNITED STATES PATENT OFFICE.

JULIAN KENNEDY, OF PITTSBURGH, PENNSYLVANIA.

RAIL-JOINT.

1,135,695.　　Specification of Letters Patent.　Patented Apr. 13, 1915.

Application filed September 22, 1913. Serial No. 790,971.

*To all whom it may concern:*

Be it known that I, JULIAN KENNEDY, a citizen of the United States, residing at Pittsburgh, in the county of Allegheny and State of Pennsylvania, have invented a new and useful Improvement in Rail-Joints, of which the following is a full, clear, and exact description, reference being had to the accompanying drawings, forming part of this specification, in which—

Figure 1 is a vertical section of a rail joint embodying my invention; and Fig. 2 is a horizontal section, the plane of section being at the joint bolts.

My invention has relation to rail joints and is designed to provide a rail joint having joint bolts of novel character.

Heretofore the best practice in rail joint construction has been to form the unthreaded portions of the joint bolts of a diameter somewhat less than the diameter of the threaded portion, in order that whatever stretching of the bolts occurs in service will occur in this unthreaded portion rather than in the threaded portion. By this construction of the bolts, any looseness due to stretching of the bolts can be readily taken up by tightening the nuts, the thread on the bolts being uninjured by the stretching. This construction, however, has given rise to the following difficulty. While the bolt holes in the webs of the rails are commonly made considerably larger than the maximum diameter of the bolts, it frequently happens that the bolts are either not initially centered in these openings, or if initially centered, they get out of center by the shifting of the rails and joint plates relatively to each other. This produces a condition in which the sides of the bolts may be in close contact with one side of the bolt holes in the web of the rail, and the bolts being bound by the joint plates, can not be removed without injury to the threads. My invention is designed to overcome this difficulty by providing a bolt in which the unthreaded portion is at least of as great an external diameter as the external diameter of its threaded portion; and to provide for stretching of this threaded portion by weakening the unthreaded portion in a manner other than reduction of its external diameter. I thereby make the unthreaded portion guard the threads in removing the bolts under conditions such as above stated, while at the same time I largely confine the stretching to the unthreaded portion.

Referring to the accompanying drawing, in which I have illustrated one embodiment of my invention, the numeral 2 designates the track rails, 3 the fish plates or joint members, and 4 the track bolts. In accordance with my invention, I make the intermediate portions 5 of these bolts of an external diameter at least as great as the external diameter of the threaded portion 6 of the bolts. The effective diameter of this portion of the bolts is, however, reduced by the internal longitudinal cavity 7. This cavity reduces the metal of this portion of the bolts to a sufficient extent so that it will stretch in preference to the solid threaded portion of the same external diameter. This intermediate portion having at least as great an external diameter as the external diameter of the threads, the bolts can be readily removed under various conditions of the joint without injury to the threads.

My invention is applicable to various forms of rail joints and the bolts may, of course, vary specifically from the form which I have shown, so long as they contain the essential features hereinafter claimed.

I claim:

1. In a rail joint, the combination with a rail and joint members, of track bolts extending through the rail and the joint members, said bolts having an intermediate unthreaded portion of an external diameter at least as great as the external diameter of its threaded end portion, said intermediate portion being weakened relatively to the threaded end portion to cause the major part of the stretching of the bolt to occur in said intermediate portion, substantially as described.

2. In a rail joint, the combination with a rail and joint members, of track bolts extending through the rail and the joint members, said bolts having an intermediate unthreaded portion of an external diameter at least as great as the external diameter of its threaded end portion, said intermediate portion being internally weakened relatively to the threaded end portion to cause the major part of the stretching of the bolt to occur in said intermediate portion, substantially as described.

3. In a rail joint, the combination with a rail and joint members, of track bolts extending through the rail and the joint members, said bolts having an intermediate unthreaded portion of an external diameter at least as great as the external diameter of its threaded end portion, said intermediate portion being internally weakened by the removal of a portion of the metal from the interior thereof relatively to the threaded end portion said weakened portion terminating short of the threaded portion of the bolt, substantially as described.

4. A rail joint having a joint bolt formed with a threaded end portion and an unthreaded intermediate portion, the intermediate portion being of an external diameter substantially as great as the maximum diameter of the threaded end portion, but having a portion of the metal removed from the interior thereof, with its threaded portion solid substantially as described.

5. A joint bolt, having a head at one end and an externally threaded portion at the opposite end, and a cavity extending longitudinally into the bolt through the headed end thereof, said cavity terminating short of the threaded portion of the bolt; substantially as described.

In testimony whereof I have hereunto set my hand.

JULIAN KENNEDY.

Witnesses:
A. F. TIBBETTS,
GEORGE H. PARMELEE.